(12) United States Patent
Crane et al.

(10) Patent No.: US 6,614,628 B2
(45) Date of Patent: Sep. 2, 2003

(54) MOVING COIL MICRO ACTUATOR WITH REDUCED ROTOR MASS

(75) Inventors: Peter Crane, St. Paul, MN (US); Wayne A. Bonin, North Oaks, MN (US); Roger L. Hipwell, Jr., Eden Prairie, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 8 days.

(21) Appl. No.: 10/051,366

(22) Filed: Jan. 18, 2002

(65) Prior Publication Data

US 2002/0096944 A1 Jul. 25, 2002

Related U.S. Application Data

(60) Provisional application No. 60/262,895, filed on Jan. 19, 2001.

(51) Int. Cl.$^7$ ................................................. G11B 5/56
(52) U.S. Cl. ................................................. 360/294.51
(58) Field of Search ...................................... 360/294.5

(56) References Cited

U.S. PATENT DOCUMENTS

| | | | |
|---|---|---|---|
| 3,924,268 A | 12/1975 | McIntosh et al. | 360/78 |
| 4,374,402 A | 2/1983 | Blessom et al. | 360/104 |
| 4,651,242 A | 3/1987 | Hirano et al. | 360/103 |

(List continued on next page.)

FOREIGN PATENT DOCUMENTS

| | | | | |
|---|---|---|---|---|
| EP | 0 412 221 B1 | 11/1989 | | G11B/21/02 |
| JP | 63-122069 | 5/1988 | | G11B/21/02 |
| JP | 02-263369 | 10/1990 | | G11B/21/10 |
| JP | 04-134681 | 5/1992 | | G11B/21/10 |
| JP | 04-368676 | 12/1992 | | G11B/21/08 |
| JP | 05-094682 | 4/1993 | | G11B/21/21 |
| JP | 06-020412 | 1/1994 | | G11B/21/10 |
| JP | 07-085621 | 3/1995 | | G11B/21/20 |

OTHER PUBLICATIONS

"Silicon Micromachined Electromagnetic Microactuators for Rigid Disk Drives" by Tang et al., *IEEE Transactions on Magnetics*, vol. 31, No. 6, Nov. 1995.

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics* vol. 32, No. 5, Sep. 1996.

"Transverse Mode Electrostatic Microactuator for MEMS––Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

(List continued on next page.)

*Primary Examiner*—Robert S. Tupper
(74) *Attorney, Agent, or Firm*—Kinney & Lange, P.A.

(57) ABSTRACT

A disc drive has a disc rotatable about an axis, a slider carrying a transducing head for transducing data with a disc, and a dual stage actuation assembly supporting the slider to position the transducing head adjacent a selected radial track of the disc. The dual stage actuation assembly includes a movable actuator arm and a suspension assembly supported by the actuator arm. The suspension assembly includes a gimbal. The dual stage actuation assembly further includes a microactuator. The microactuator includes a stator having a top surface and a bottom surface wherein the gimbal is connected to the top surface of the stator. A rotor is operatively connected to the stator and the rotor supports the slider. A magnetic keeper structure is supported by the stator such that the rotor moves with respect to the magnetic keeper structure.

22 Claims, 11 Drawing Sheets

U.S. PATENT DOCUMENTS

| | | | |
|---|---|---|---|
| 4,764,829 A | 8/1988 | Makino | 360/106 |
| 4,914,725 A | 4/1990 | Belser et al. | 318/560 |
| 4,916,635 A | 4/1990 | Singer et al. | 364/513 |
| 5,021,906 A | 6/1991 | Chang et al. | 360/103 |
| 5,034,828 A | 7/1991 | Ananth et al. | 360/75 |
| 5,177,652 A | 1/1993 | Yamaguchi et al. | 360/78.05 |
| 5,189,578 A | 2/1993 | Mori et al. | 360/106 |
| 5,303,105 A | 4/1994 | Jorgenson | 360/106 |
| 5,364,742 A | 11/1994 | Fan et al. | 430/317 |
| 5,375,033 A | 12/1994 | MacDonald | 361/281 |
| 5,521,778 A | 5/1996 | Boutaghou et al. | 360/106 |
| 5,638,267 A | 6/1997 | Singhose et al. | 364/148 |
| 5,657,188 A | 8/1997 | Jurgenson et al. | 360/106 |
| 5,745,319 A | 4/1998 | Takekado et al. | 360/78.05 |
| 5,764,444 A | 6/1998 | Imamura et al. | 360/109 |
| 5,781,381 A | 7/1998 | Koganezawa et al. | 360/106 |
| 5,796,558 A | 8/1998 | Hanrahan et al. | 360/106 |
| 5,801,472 A | 9/1998 | Wada et al. | 310/309 |
| 5,805,375 A | 9/1998 | Fan et al. | 360/78.12 |
| 5,856,896 A | 1/1999 | Berg et al. | 360/104 |
| 5,863,024 A | 1/1999 | Blind et al. | 251/129.01 |
| 5,867,347 A | 2/1999 | Knight et al. | 360/104 |
| 5,896,246 A | 4/1999 | Budde et al. | 360/104 |
| 5,898,541 A | 4/1999 | Boutaghou et al. | 360/109 |
| 5,898,544 A | 4/1999 | Krinke et al. | 360/104 |
| 5,920,441 A | 7/1999 | Cunningham et al. | 360/78.05 |
| 5,936,805 A | 8/1999 | Imaino | 360/104 |
| 5,945,898 A | 8/1999 | Judy et al. | 335/78 |
| 5,959,808 A | 9/1999 | Fan et al. | 360/106 |
| 6,043,957 A | 3/2000 | Hattori et al. | 360/106 |
| 6,064,550 A | 5/2000 | Koganezawa | 360/106 |
| 6,268,984 B1 * | 7/2001 | Boutaghou | 360/294.5 |
| 6,414,822 B1 * | 7/2002 | Crane et al. | 360/294.5 |
| 6,414,823 B1 * | 7/2002 | Crane et al. | 360/294.5 |

OTHER PUBLICATIONS

"Micro Electrostatic Actuators in Dual–Stage Drives Disks with High Track Density" by Tang et al., *IEEE Transactions on Magnetics*, vol. 32, No. 5, Sept. 1996.

"Piezoelectric Microactuator Compensating for Off–Track Errors in Magnetic Disk Drives" by Imamura et al, *Advance Infromation Storage Systems*, vol. 5, pp 119–126.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–½Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Drives" by Temesvary et al., *Journal of Microelectromechanical Systems*, vol. 4, No. 1, Mar. 1995.

* cited by examiner

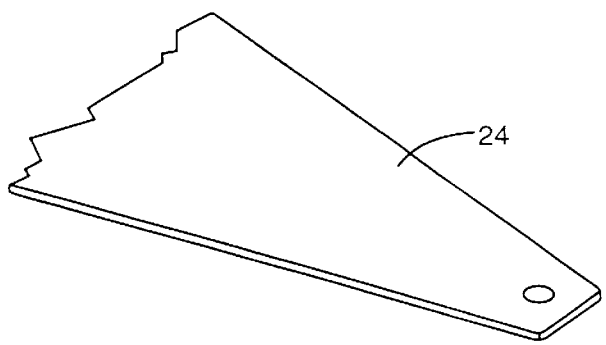
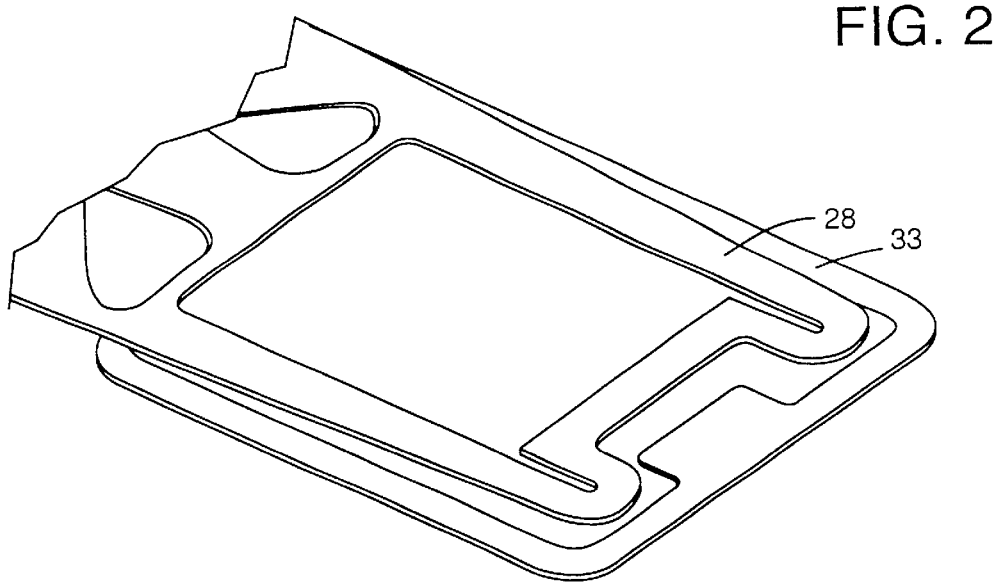
FIG. 2
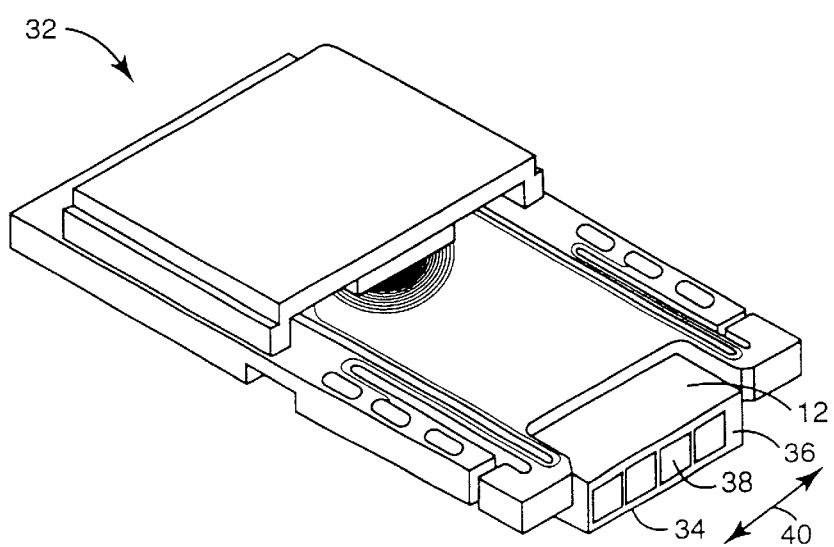

MOVING COIL MICRO ACTUATOR WITH REDUCED ROTOR MASS

CROSS-REFERENCE TO RELATED APPLICATION(S)

This application claims priority from Provisional Application No. 60/262,895, filed Jan. 19, 2001, for "MOVING COIL MICRO ACTUATOR WITH REDUCED ROTOR MASS" by Peter Crane, Wayne Bonin, Roger L. Hipwell, Jr., and Zine Eddine Boutaghou.

BACKGROUND OF THE INVENTION

The present invention relates to a disc drive microactuator system and more particularly to an improved structure for reduced mass of the microactuator rotor.

The density of concentric data tracks on magnetic discs continues to increase (that is, the width of data tracks and radial spacing between data tracks are decreasing), requiring more precise radial positioning of the transducing head. Conventionally, head positioning is accomplished by operating an actuator arm with a large-scale actuation motor, such as a voice coil motor (VCM), to radially position a slider (which carries the head) on a gimbal at the end of the actuator arm. The large-scale motor lacks sufficient resolution to effectively accommodate high track-density discs. Thus, a high resolution head positioning mechanism, or microactuator, is necessary to accommodate the more densely spaced tracks.

One particular design for high resolution head positioning involves employing a high resolution microactuator in addition to the conventional lower resolution actuator motor, thereby affecting head positioning through dual-stage actuation. Various microactuator designs have been considered to accomplish high resolution head positioning. Microactuators typically include a stator portion and a rotor portion, the stator being attached to the gimbal and the rotor supporting the slider. The rotor is movable with respect to the stator such that the slider can be precisely positioned over a track of a disc.

To accomplish fine positioning of the microactuator, a magnetic circuit allows the rotor to be moved in response to a current provided to the magnetic circuit. The magnetic circuit comprises a bottom keeper, magnets, a conductive coil, and a top keeper. The magnetic circuit generates a microactuator force to allow movement of the rotor in response to the current and the microactuator force is typically constant. Prior art microactuator configurations place a substantial amount of heavy magnetic circuit components on the rotor.

The microactuator has suspension springs which can be arranged to provide linear motion of the slider by the microactuator. A disadvantage of linear microactuators is the inability to control large amplitude oscillation of the rotor caused by VCM actuator seeking. During seek acceleration of the VCM to coarsely position the actuator arm, the entire microactuator is in linear motion and large amplitude ringing occurs. The acceleration force of the VCM causes the suspension springs in the microactuator to oscillate the rotor carrying the slider within the stator at a resonant frequency causing the large amplitude ringing. Controlling the large amplitude oscillation of the rotor can be done by predisplacing the rotor to the position it would have during steady state VCM acceleration. For example, predisplacing the rotor may be accomplished by applying a current to the microactuator which generates a microactuator force sufficient to oppose the VCM acceleration force and reduce the net force exerted on the rotor. The microactuator force generated by the magnetic circuit to predisplace the rotor is a function of VCM acceleration and rotor mass.

A high VCM acceleration is desirable to reduce the track seeking time and increase the data throughput of the drive. If the microactuator force remains constant during disc drive operation (as it typically does), the ability to increase the VCM acceleration requires reducing the mass of the rotor. There exists a need in the art for a microactuator having a reduced rotor mass.

BRIEF SUMMARY OF THE INVENTION

The present invention relates to a disc drive having a disc rotatable about an axis, a slider carrying a transducing head for transducing data with a disc, and a dual stage actuation assembly supporting the slider to position the transducing head adjacent a selected radial track of the disc. The dual stage actuation assembly includes a movable actuator arm and a suspension assembly supported by the actuator arm wherein the suspension assembly includes a gimbal. The disc drive actuation assembly further includes a microactuator. The microactuator includes a stator having a top surface and a bottom surface wherein the gimbal is connected to the top surface of the stator. A rotor is operatively connected to the stator and the rotor supports the slider. A magnetic keeper structure is supported by the stator such that the rotor moves with respect to the magnetic keeper structure.

BRIEF DESCRIPTION OF THE DRAWINGS

FIG. 2 is an exploded perspective view of a portion of a disc drive including a microactuator.

DETAILED DESCRIPTION

Figure 1:
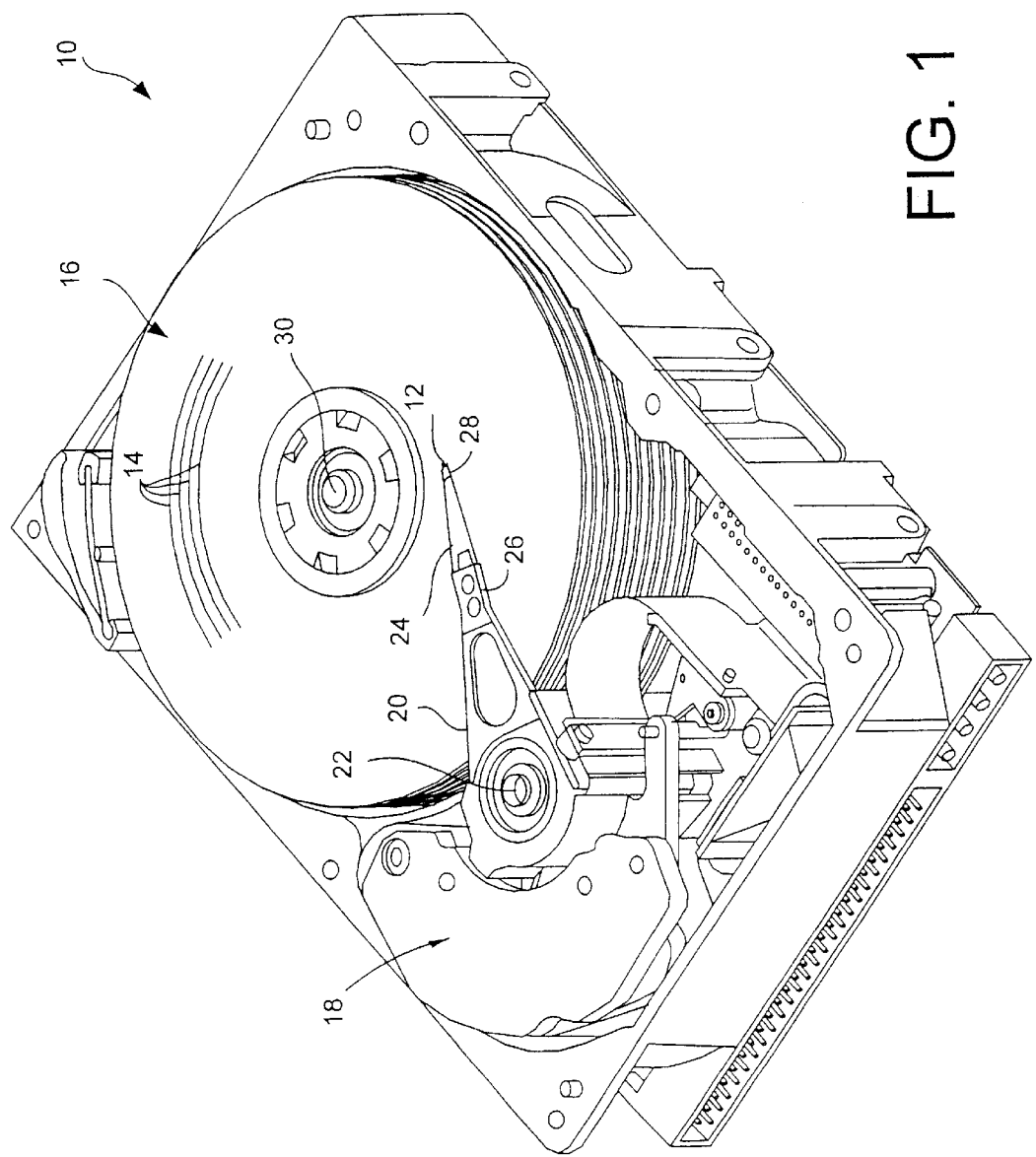
FIG. 1 is a perspective view of a conventional disc actuation system for positioning a slider over a track of a disc.

FIG. 1 is a perspective view of a disc drive actuation system 10 for positioning a slider 12 over a track 14 of a disc 16. Actuation system 10 includes a voice coil motor (VCM) 18 (or main actuator) arranged to rotate an actuation arm 20 on a spindle around an axis 22. A load beam 24 is connected to actuator arm 20 at a head mounting block 26. A gimbal 28 is connected to an end of load beam 24, and carries slider 12. Gimbal 28 provides a spring connection between load beam 24 and slider 12. Slider 12 carries a transducing head (not shown) for reading and/or writing data on concentric tracks 14 of disc 16. Disc 16 rotates around axis 30, so that windage is encountered by slider 12 to keep slider 12 aloft a small distance above the surface of disc 16.

VCM 18 is selectively operated to move actuator arm 20 about axis 22, thereby moving slider 12 between tracks 14 of disc 16. However, for disc drive systems with high track density, VCM 18 lacks significant resolution and frequency response to position a transducing head on slider 12 precisely over a selected track 14 of disc 16. Therefore, a high resolution actuation device is necessary.

FIG. 2 is an exploded perspective view of a portion of the disc drive including a microactuator 32 for high resolution head positioning. A flex circuit 33 is attached to a bottom surface of gimbal 28 (shown in FIG. 1). Gimbal 28 is attached to load beam 24 and microactuator 32 is attached to flex circuit 33. Microactuator 32 carries slider 12 above a surface of disc 16. The transducing head (not shown) is carried by slider 12 to write and read the data to and from the disc. The transducing head is located on a disc opposing face 34 of slider 12. Slider 12 has a trailing edge 36 with four slider bond pads 38 attached thereto which aid in providing the electrical connection between the disc drive and slider 12, as discussed below.

In operation load beam 24, gimbal 28, and microactuator 32 carrying slider 12 are all moved together as coarse positioning is performed by VCM 18 (FIG. 1) moving actuator arm 20 (FIG. 1). To achieve fine positioning of the transducing head, microactuator 32 generates a force which causes bending of beam springs located on the microactuator. As a result, the portion of microactuator 32 carrying slider 12 moves slightly with respect to gimbal 28 in the direction of arrows 40, displacing the transducing head with high resolution for precise positioning of the transducing head over a selected track of the disc.

Figure 3:
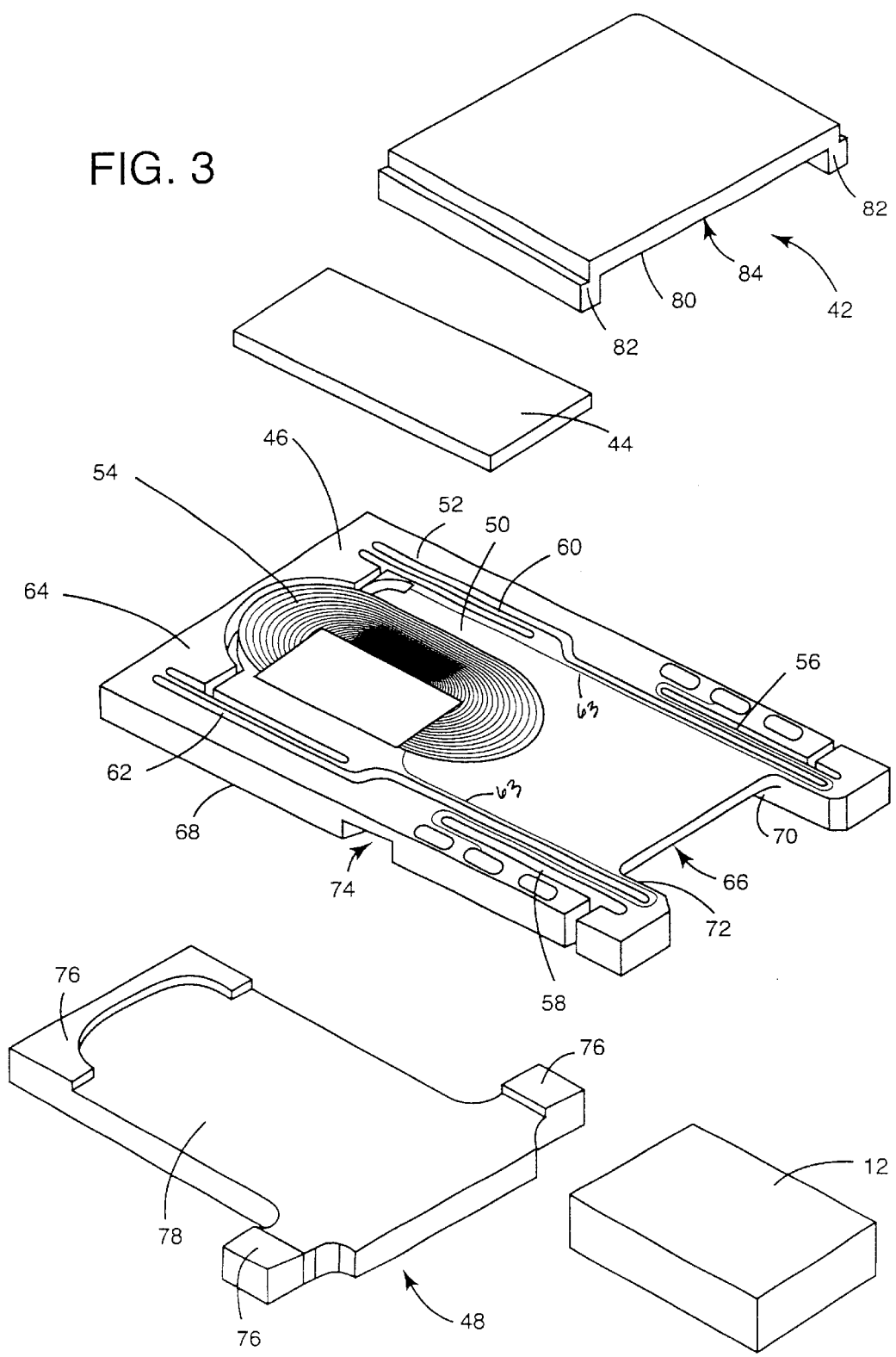
FIG. 3 is an exploded perspective view of a first embodiment of a microactuator.

FIG. 3 is an exploded perspective view of microactuator 32 with slider 12. The microactuator comprises a top keeper 42, a magnet 44, a microactuator frame 46 and a bottom keeper 48. Microactuator frame 46 includes a rotor 50, a stator 52, and a magnetic coil 54 (or moving coil). Rotor 50, the moving part of microactuator 32, is connected to stator 52 by beam springs 56, 58, 60 and 62. Magnetic coil 54 and electrical interconnect lines 63 are embedded into rotor 50 on a top surface 64 of microactuator frame 46. Magnetic coil 54 and interconnect lines 63 are preferably formed by a damascene process.

Rotor 50 has a slider bonding tub 66 on a bottom surface 68 of microactuator frame 46. Slider bonding tub 66 has a tub cap 69 and first and second sidewall 70 and 72. Slider 12 is positioned within slider bonding tub 66. A bottom keeper tub 74 is formed on bottom surface 68 of microactuator frame 46 for receiving bottom keeper 48. Bottom keeper 48 has standoffs 76 for attaching bottom keeper 48 to microactuator frame 46. Standoffs 76 extend upward from a top surface 78 of bottom keeper 48. Although bottom keeper 48 is shown with three standoffs 76, other embodiments of bottom keeper 48 may include any number of standoffs 76. Top keeper 42 has a bottom surface 80. Standoffs 82 extend downward from bottom surface 80 of top keeper 42 to define a channel 84. Standoffs 76 and 82 are preferably formed by etching.

Rotor 50 is operatively connected to stator 52 by beam springs which are arranged to enable linear motion of slider 12. Distal beam springs 56 and 58 are located on opposite sides of slider bonding tub 66 and connect rotor 50 and stator 52. Proximal beam springs 60 and 62 are located on opposite sides of bottom keeper tub 74 and connect rotor 50 and stator 52. Although FIG. 3 shows one configuration of a linear microactuator, those skilled in the art will recognize many other linear microactuators may be used in the present invention.

Figure 4:
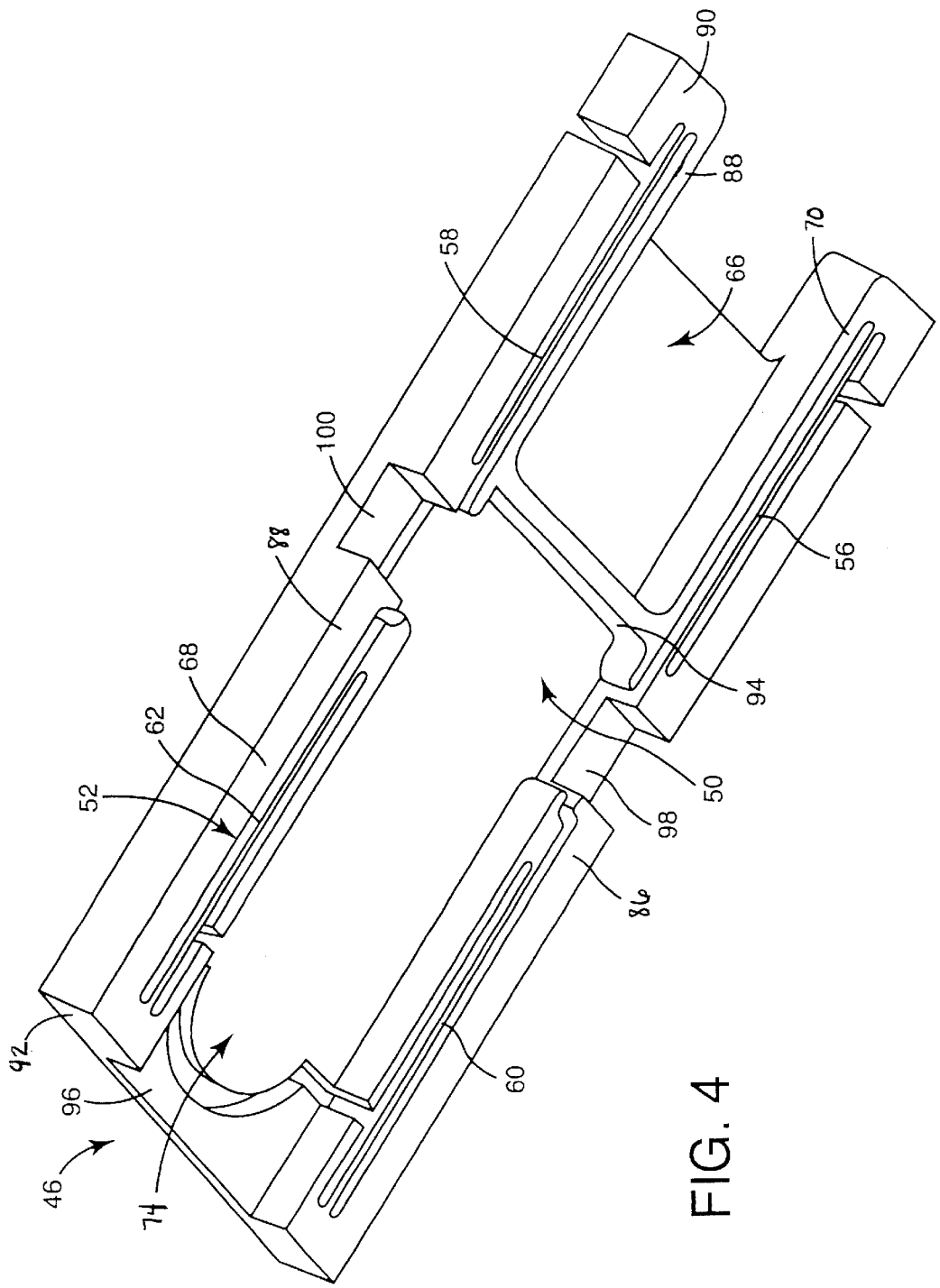
FIG. 4 is a bottom perspective view of the first embodiment of the microactuator.

FIG. 4 is a bottom perspective view of microactuator frame 46 showing bottom surface 68, rotor 50 and stator 52. Outer bars 86 and 88 form a portion of stator 52 and extend the entire length of microactuator frame 46 having a distal end 90 and a proximal end 92. Beam springs 56, 58, 60, 62, sidewalls 70, 72, and a portion of microactuator frame 46 (where the magnetic coil 54) is located form rotor 50 of microactuator 32. Sidewalls 70 and 72 of rotor 50, along with tub cap 69, support slider 12 within slider bonding tub 66. A rear wall 94 is a third wall of slider bonding tub 66. Rear wall 94 is located between slider bonding tub 66 and bottom keeper tub 74 such that it forms a part of rotor 50. Each distal beam spring 56 and 58 attaches to a distal end of sidewalls 70 and 72, respectively. Distal beam springs 56 and 58 extend longitudinally and attach to a mid-portion of outer bars 86 and 88, respectively. Each proximal beam spring 60 and 62 attaches to rotor 50 near a mid-portion of the rotor. Proximal beam springs 60 and 62 extend longitudinally and attach to the proximal end 92 of outer bars 86 and 88, respectively. Beam springs 56, 58, 60 and 62 thereby connect rotor 50 to stator 52 (via outer bars 86 and 88).

Slider bonding tub 66 is located at the distal end of microactuator frame 46 adjacent rotor 50 and is recessed from bottom surface 68. Bottom keeper tub 74 is positioned at the proximal end of microactuator frame 46 and adjacent to the location of magnetic coil 54. Tubs 66 and 74 are preferably formed by an etching process. Tub 74 is recessed from bottom surface 68 of microactuator frame 46 proximate both rotor 50 and stator 52. Tub 74 includes mounting points 96, 98 and 100 which are located on stator 52. Mounting point 96 is located at the proximal end of microactuator frame 46 and mounting points 98 and 100 are located between distal beam springs 56 and 58 and proximal beam springs 60 and 62, respectively, on opposite sides of microactuator frame 46.

Figure 5:
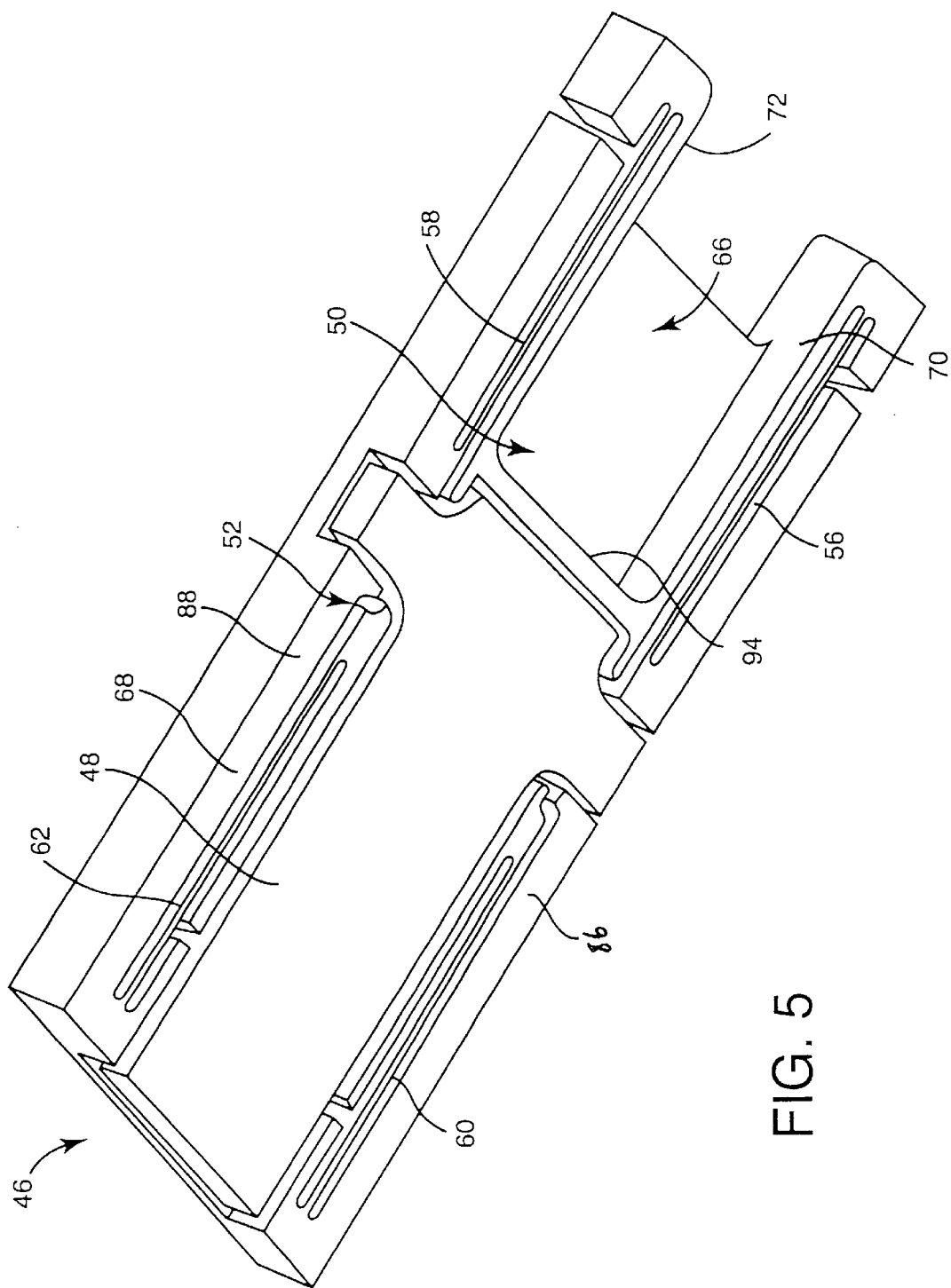
FIG. 5 is a bottom perspective view of the first embodiment of the microactuator with a bottom keeper attached.

FIG. 5 shows a bottom perspective view of microactuator frame 46 with bottom keeper 48 positioned within bottom keeper tub 74 and attached to stator 52. When bottom keeper 48 is attached to microactuator frame 46, standoffs 76 are attached to mounting points 96, 98 and 100 of stator 52 such that no part of bottom keeper 48 contacts rotor 50.

Figure 6:
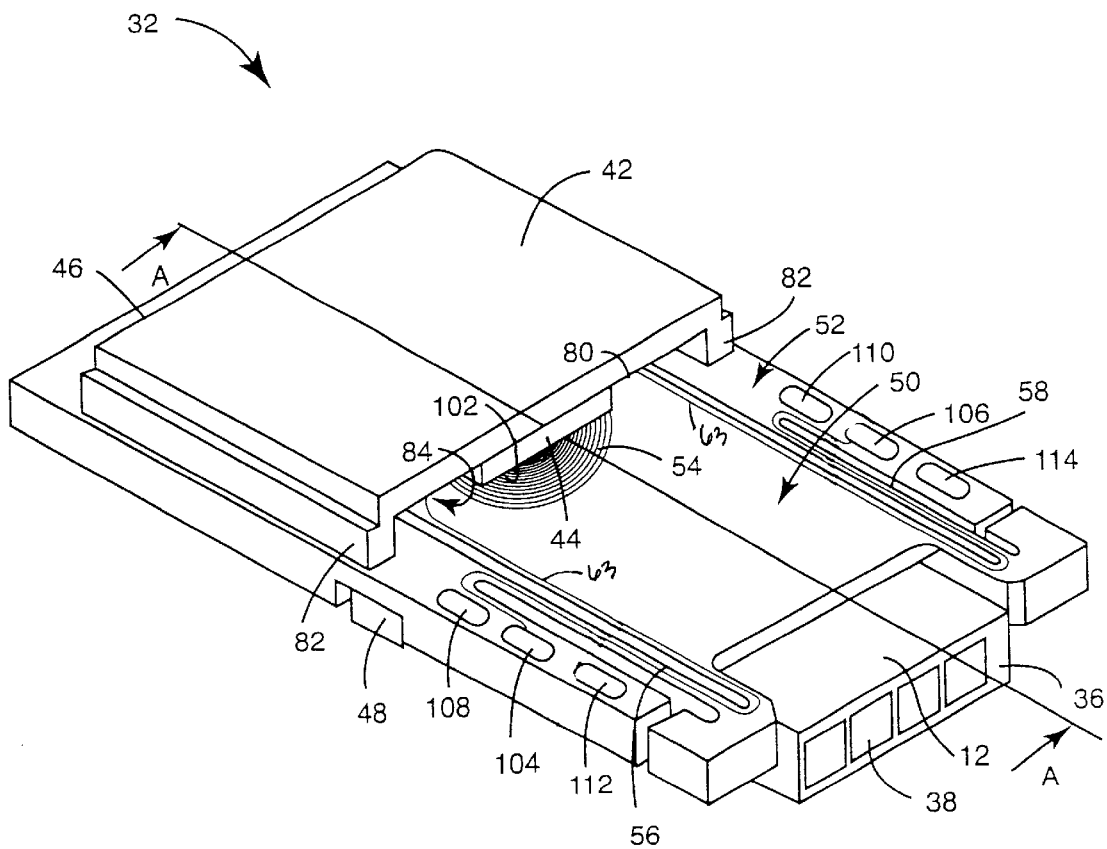
FIG. 6 is a perspective view of the first embodiment of the microactuator.
Figure 7:
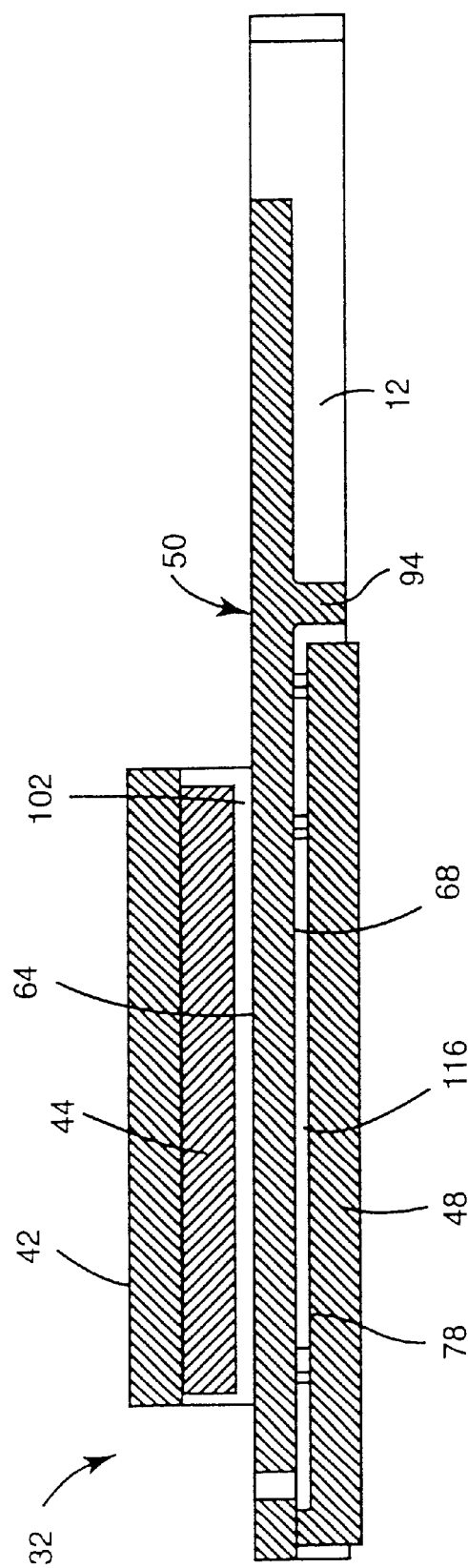
FIG. 7 is a sectional view of the first embodiment of the microactuator taken along line A—A of FIG. 6.

FIG. 6 is a top perspective view of an assembled microactuator 32 and FIG. 7 is a sectional view of microactuator 32 taken along line A—A of FIG. 6. Top keeper 42 is attached to top surface 64 of microactuator frame 46 on stator 52 adjacent magnetic coil 54. Magnet 44 is attached to bottom surface 80 of top keeper 42 within channel 84. Standoffs 82 are attached to stator 52 such that when assembled, magnet 44 is positioned adjacent magnetic coil 54. Standoffs 82 space magnet 44 the proper distance above magnetic coil 54. A top gap 102 or mechanical separation, is formed between magnet 44 and magnetic coil 54 on rotor 50. Since top keeper 42 is attached to stator 52 and magnet 44 is attached to top keeper 42, neither top keeper 42 nor magnet 44 are included in the mass of rotor 50.

Drive terminals 104 and 106, ground terminals 108 and 110, and dummy terminals 112 and 114 are located on stator 52 of microactuator frame 46. Drive terminals 104 and 106 are used to provide drive current to microactuator 32. Ground terminals 108 and 110 are used for a grounding trace. Dummy terminals 112 and 114 are used to provide a bonding surface for attaching gimbal 28 to microactuator 32 and increase the strength of that joint. Electrical interconnect lines 63, preferably made of copper and formed by a damascene process, are embedded in distal beam springs 56 and 58 and rotor 50 to route the current between drive terminals 104 and 106 on stator 52 to magnetic coil 54 on rotor 50.

Bottom keeper 48 is attached to mounting points 96, 98 and 100 of bottom keeper tub 74. Standoffs 76, extending upward from top surface 78 of bottom keeper 48, are attached to stator 52. A bottom gap 116 is formed between bottom keeper 48 and rotor 50 of microactuator frame 46, such that there is no contact between bottom keeper 48 and rotor 50. Standoffs 76 define gap 116 between bottom keeper 48 and moving rotor 50. Bottom keeper 48 is not included in the mass of rotor 50.

In operation, a magnetic circuit is comprised of a magnetic keeper structure including top keeper 42 and bottom keeper 48, magnet 44, and magnetic coil 54. To actuate microactuator 32, a current is driven through coil 54. The magnetic circuit created between magnet 44 and coil 54 generates a force to actuate microactuator 32 and move rotor 50 in the direction of arrows 40 with respect to stator 52. The movement of rotor 50, and thereby slider bonding tub 66, finely positions slider 12, and thereby the transducing head, over a track of the disc. When microactuator 32 is assembled, top keeper 42 in conjunction with bottom keeper 48 closes the magnetic circuit used to actuate microactuator 32 and shields the rest of the disc drive from any stray magnetic field generated by the magnetic circuit.

Figure 8:
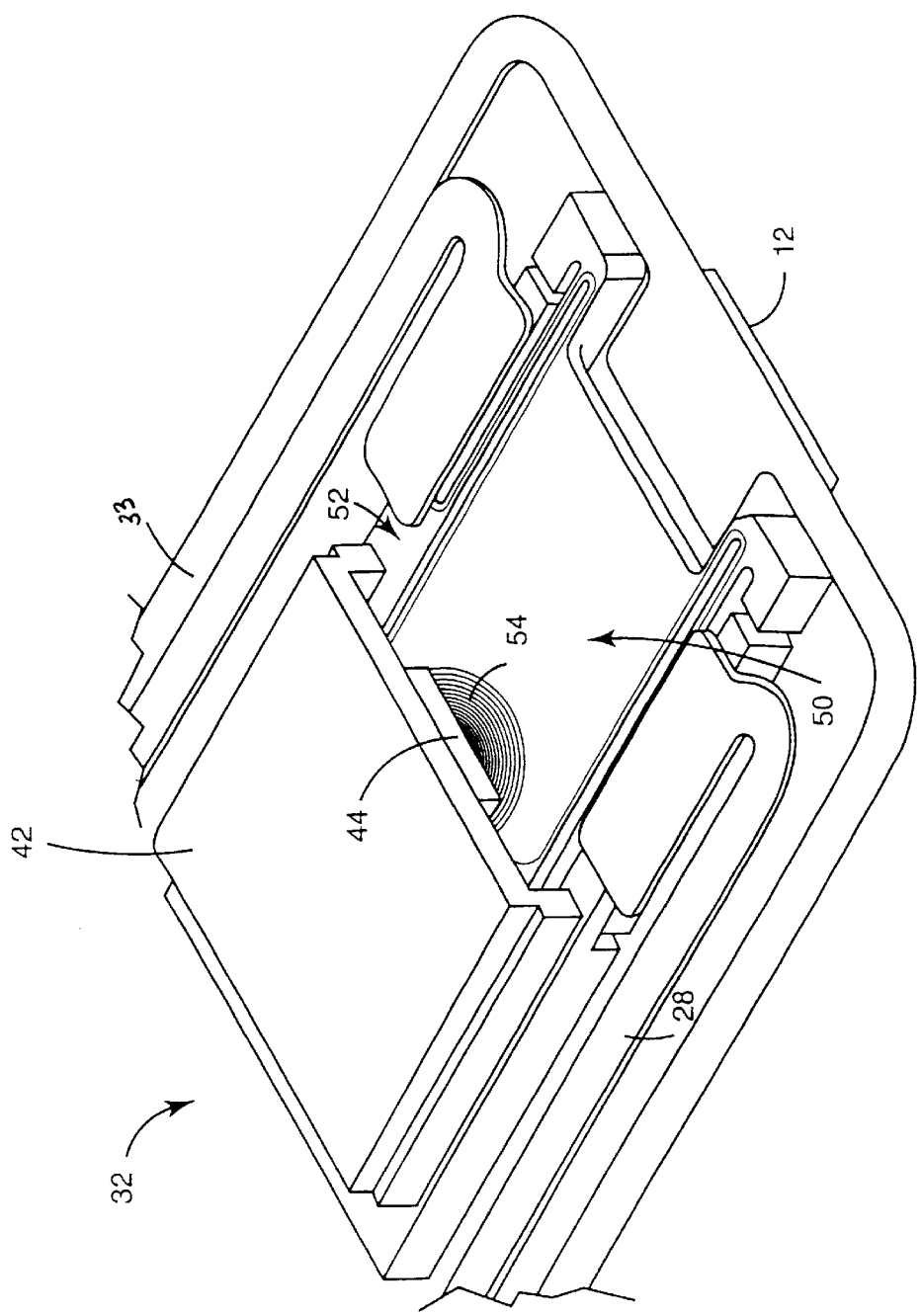
FIG. 8 is a perspective view of the first embodiment of the microactuator with a flex circuit attached.
Figure 9:
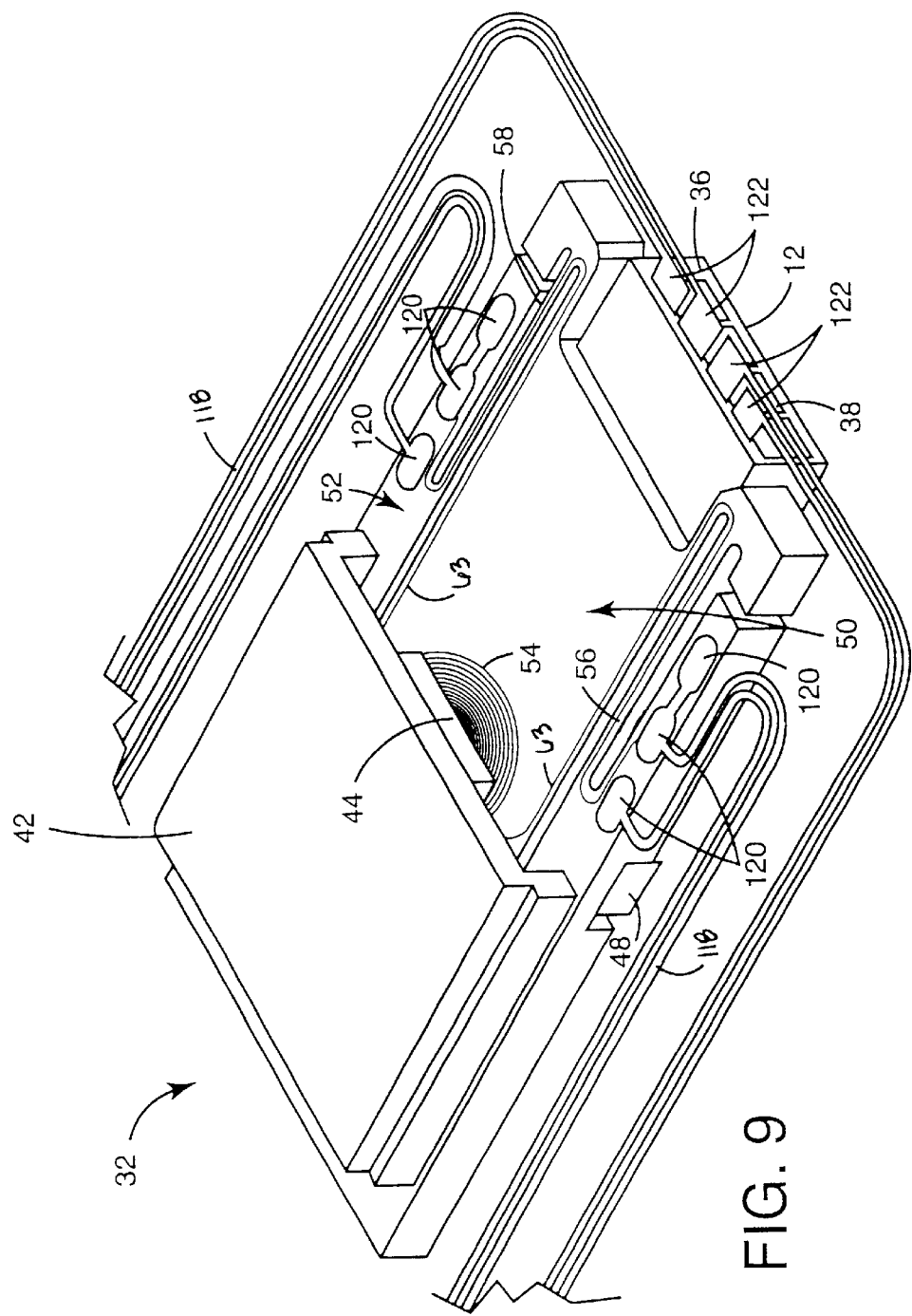
FIG. 9 is a perspective view of the first embodiment of the microactuator with the flex circuit substrate removed.

FIG. 8 is a top perspective view of microactuator 32 with flex circuit 33 attached (without gimbal 28) and FIG. 9 is a top perspective view of microactuator 32 showing a trace material 118 (with substrate material of flex circuit 33 removed). Flex circuit 33 is attached to slider 12 (supported by rotor 50) and is also attached to stator 52 adjacent drive terminals 104 and 106, ground terminals 108 and 110, and dummy terminals 112 and 114. The location of the terminals on stator 52 and the attachment of flex circuit 33 (and thereby gimbal 28) to stator 52 further reduces the mass of rotor 50. Prior to attaching microactuator 32 to gimbal 28, flex circuit material 33 is disposed on gimbal 28. Flex circuit 33 consists of copper trace material 118 (shown in FIG. 9) and polyamide substrate material (shown in FIG. 8). Copper trace material 118 forms terminal pads 120 on top of terminals 104–114, and terminal pads 122 adjacent slider bond pads 38 on trailing edge 36 of slider 12. Terminal pads 122 are bond pads for electrical connection to slider 12. Flex circuit 33 is able to move and deflect with rotor 50. Trace material 118 completes a circuit connection between the electrical components of the disc drive, microactuator 32 and slider 12.

Flex circuit material 33, as well as trace material 118, travels along the underside of actuator arm 20, load beam 24 and gimbal 28. Trace material 118 terminates at terminals 104–114 and terminal pads 122. Typically, a gold bond ball is disposed on each terminal pad 122 and bonded to its respective slider bond pad 38 to act as an electrical conduit and complete the electrical connection between slider 12 and the disc drive. Electrical interconnect lines 63 are embedded in distal beam springs 56 and 58 to route the drive current between the terminals on stator 52 and coil 54 on rotor 50.

With reference to FIG. 1, during seek acceleration of VCM 18, actuator arm 20 is moved over the surface of disc 16 to coarsely position the transducing head carried by slider 12. Stator 52 and slider 12 of microactuator 32 are connected to flex circuit 33 on gimbal 28. Gimbal 28 is attached to load beam 24 and load beam 24 is connected to actuator arm 20. Thus when VCM 18 moves actuator arm 20, microactuator 32 is in linear motion as well. Slider 12 is carried by rotor 50 of microactuator 32 and rotor 50 is connected to stator 52 by beam springs 56, 58, 60 and 62. The acceleration force of VCM 18 during seek acceleration is transferred through beam springs 56, 58, 60 and 62 to cause undesirable deflection of rotor 50 with respect to stator 52. Seek acceleration transfers the acceleration force of VCM 18 to rotor 50, thereby creating a large amplitude oscillation of rotor 50. The large amplitude oscillation results in rotor disturbance or ringing. Microactuator 32 of the present invention maintains control of slider 12 position during track seeking and eliminates oscillations of rotor 50.

A high VCM acceleration is desirable to reduce the track seek time and increase the data throughput of the disc drive. The track seek acceleration by VCM 18 maybe as high as 200 gravities (g). The force generated by microactuator 32 is determined by the magnet and coil properties and how much current can be run through the magnetic circuit. Therefore the microactuator force remains substantially constant, and is preferably high enough to keep slider 12 from oscillating under the influence of VCM seek acceleration. Thus, since the VCM acceleration is determined by the seek time specification, the force required by the microactuator is mainly a function of rotor 50 mass. Also reducing the mass of rotor 50 increases the available VCM acceleration.

The present invention microactuator 32 reduces the mass of rotor 50 by attaching bottom keeper 48 and top keeper 42, along with magnet 44 to stator 52 rather than rotor 50. The reduced rotor mass means a smaller current is required to generate the microactuator force needed to control rotor 50 during track seek acceleration by VCM (and maintain the desired high VCM acceleration). Furthermore, the reduced mass of rotor 50 enables the rotor, and thereby slider 12, to move more rapidly during actuation of microactuator 32.

Prior art microactuators generally had either the bottom keeper or the top keeper (along with the magnet) attached to the rotor. For example, the magnetic coil (located on the rotor) was backed by the bottom keeper. Additionally, the magnet and top keeper were assembled into a magnet holder, however, the present invention eliminates the magnet holder thereby reducing the cost of mounting the magnet. These prior art configurations of the microactuator left the rotor with a large mass thereby requiring a large microactuator force (and current) to maintain the desired high VCM acceleration.

Figure 10:
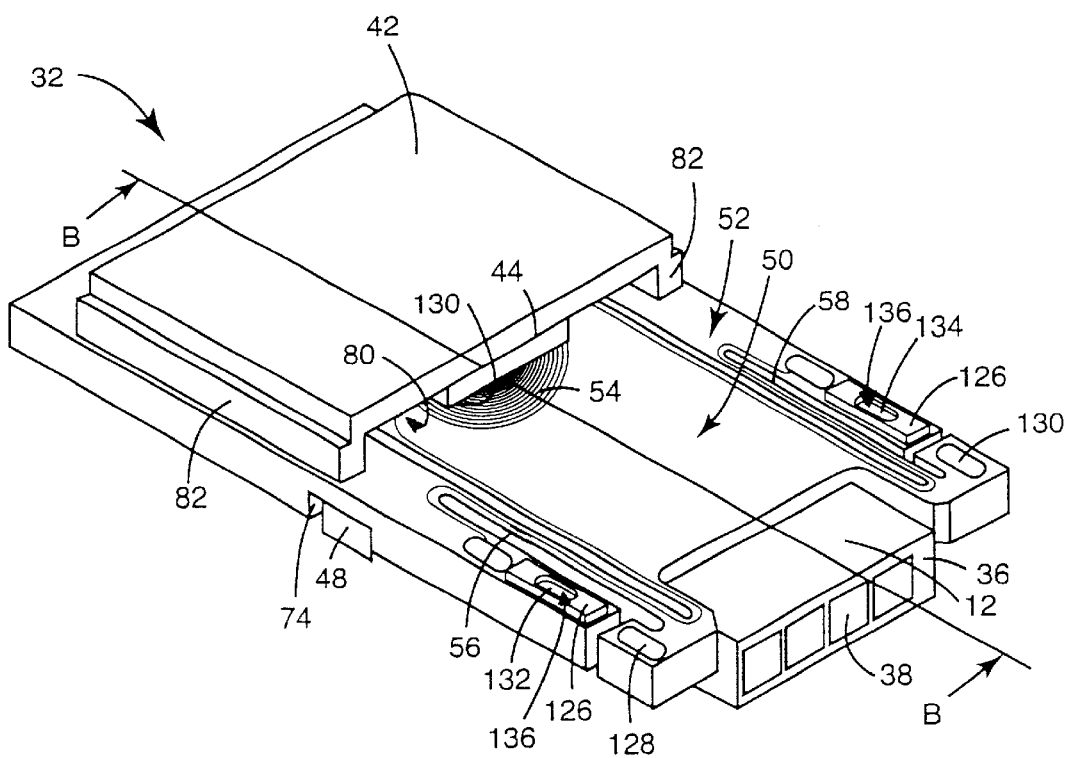
FIG. 10 is a perspective view of a second embodiment of a microactuator.
Figure 11:
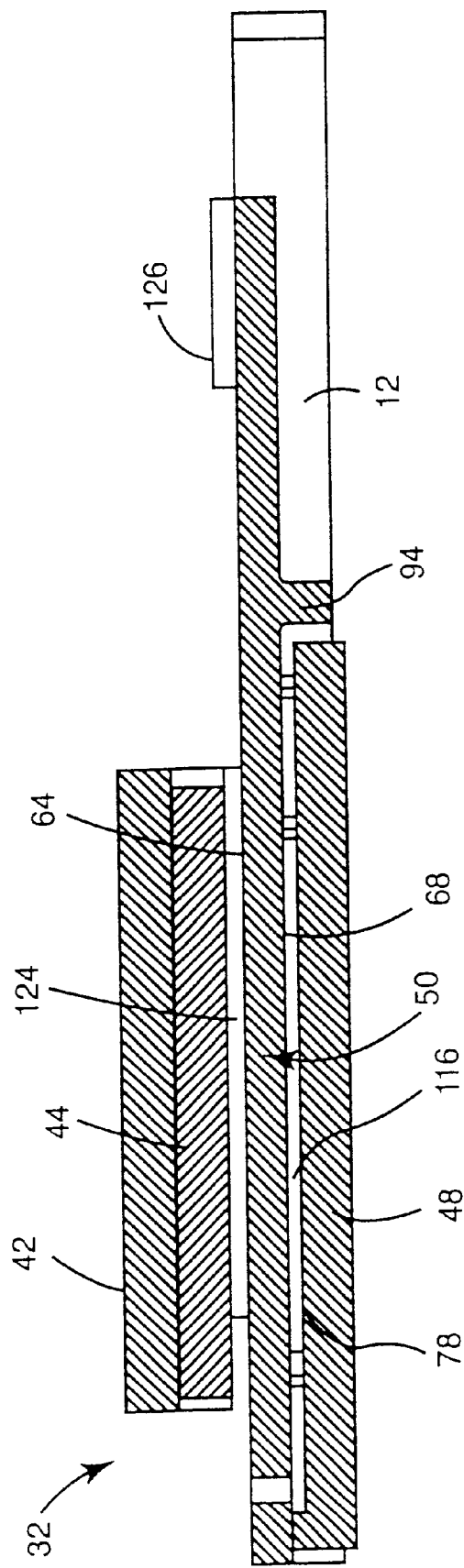
FIG. 11 is a sectional view of the second embodiment of the microactuator taken along line B—B of FIG. 10.

FIG. 10 is a perspective view of a second embodiment of microactuator 32 and FIG. 11 is a sectional view of microactuator 32 taken along line B—B of FIG. 10. Microactuator 32 includes top keeper 42, magnet 44, microactuator frame 46, bottom keeper 48 and slider 12. Top keeper 42 has standoffs 82 to attach the top keeper 42 to stator 52 of microactuator frame 46. Standoffs 82 space magnet 44 the proper distance above magnetic coil 54 such that a top gap 124 is formed between magnet 44 and magnetic coil 54. In addition, distal standoffs 126 are formed on stator 52 adjacent slider bonding tub 66. Standoffs 126 are preferably comprised of photo-imageable epoxy. Microactuator frame 46 includes bottom keeper tub 74 and mounting points 96, 98, and 100 (not shown) for mounting and positioning bottom keeper 48. The standoffs of bottom keeper 48 are attached to the mounting points of stator 52. Bottom gap 116 is formed between bottom keeper 48 and rotor 50 adjacent magnetic coil 54. Mounting bottom keeper 48 and top keeper 42, along with magnet 44, to stator 52 rather than rotor 50 reduces the mass of rotor 50.

In the second embodiment of microactuator 32, drive terminals 128 and 130 for providing drive current to microactuator 32 are located on rotor 50. Ground terminals 132 and 134 for providing a grounding trace are located on stator 52 and within a well 136 formed in distal standoffs 126. Preferably, flex circuit 33 (not shown) is attached to microactuator 32 at drive terminals 128 and 130 and slider 12 adjacent trailing edge 36.

The microactuator configuration of the present invention reduces the mass of the microactuator rotor. A bottom keeper tub is formed on the bottom surface of the microactuator frame. The tub has mounting points on the stator portion of the microactuator frame for attaching the standoffs of the bottom keeper. Although the bottom keeper is attached to the stator, the bottom keeper is housed in the tub adjacent both the rotor and the stator. A top keeper of the present invention microactuator is attached to a top surface of the microactuator frame on the stator. Standoffs extending from the top keeper are used to attach the top keeper to the stator. The magnet is attached to the bottom surface of the top keeper and the standoffs define a gap, or mechanical separation, between the magnet and the magnetic coil.

Although the present invention has been described with reference to preferred embodiments, workers skilled in the art will recognize that changes may be made in form and detail without departing from the spirit and scope of the invention.

What is claimed is:

1. A microactuator for finely positioning a transducing head carried by a slider adjacent a select radial track of a disc, the microactuator comprising:

a microactuator frame having a stator and a rotor wherein the rotor supports the slider and is movable with respect to the stator in response to actuation of the microactuator; and means, mounted to the stator and separated from the rotor, for containing a magnetic field produced by the magnetic circuit.

2. The microactuator of claim 1 wherein the means for containing the magnetic field is a magnetic keeper structure.

3. The microactuator of claim 2 wherein the magnetic keeper structure includes a bottom keeper mounted to a bottom surface of the stator.

4. The microactuator of claim 3, and further comprising:

a bottom keeper tub formed on a bottom of the micro actuator for receiving the bottom keeper.

5. The microactuator of claim 2 wherein the magnetic keeper structure includes a top keeper mounted to a top surface of the stator.

6. A disc drive having a disc rotatable about an axis, a slider carrying a transducing head for transducing data with a disc, and a dual stage actuation assembly supporting the slider to position the transducing head adjacent a selected radial track of the disc, the dual stage actuation assembly comprising:

a movable actuator arm;

a suspension assembly supported by the actuator arm, the suspension assembly including a gimbal;

a microactuator comprising:

a stator having a top surface and a bottom surface wherein the gimbal is connected to the top surface of the stator;

a rotor operatively connected to the stator and the rotor supporting the slider; and a magnetic keeper structure supported by the stator such that the rotor moves with respect to the magnetic keeper structure.

7. The disc drive of claim 6 wherein the magnetic keeper structure includes a bottom keeper mounted to the bottom surface of the stator.

8. The disc drive of claim 7 wherein a tub is formed on a bottom of the microactuator for receiving the bottom keeper.

9. The disc drive of claim 8 wherein the tub includes a mounting point on the bottom surface of the stator for mounting the bottom keeper to the stator.

10. The disc drive of claim 7 wherein a standoff extends from the bottom keeper to attach the bottom keeper to the stator.

11. The disc drive of claim 10 wherein the standoff defines a gap between the bottom keeper and the rotor.

12. The disc drive of claim 6 wherein the magnetic keeper structure includes a top keeper mounted to the top surface of the stator.

13. The disc drive of claim 12 wherein the top keeper has a pair of substantially parallel first standoffs for mounting the top keeper to the stator and the first standoffs define a gap between the top keeper and the rotor.

14. The disc drive of claim 13 wherein a magnet is attached to the top keeper and disposed within the gap.

15. A microactuator for finely positioning a transducing head carried by a slider adjacent a select radial track of a disc, the microactuator comprising:

a stator having a top surface and a bottom surface;

a rotor operatively connected to the stator, the rotor having an embedded coil and the rotor supporting the slider;

a first keeper mounted to the stator.

16. The microactuator of claim 15 wherein the first keeper is a bottom keeper mounted to the bottom surface of the stator.

17. The microactuator of claim 16, and further comprising a second keeper mounted to the top surface of the stator.

18. The microactuator of claim 16 wherein a tub is formed on a bottom of the microactuator for receiving the bottom keeper.

19. The microactuator of claim 18 wherein the tub includes a mounting point on the bottom surface of the stator for mounting the bottom keeper.

20. The microactuator of claim 16 wherein the first keeper is a top keeper mounted to the top surface of the stator.

21. The microactuator of claim 16 wherein a first standoff extends from the first keeper for attaching the first keeper to the stator and the first standoff defines a gap between the first keeper and the rotor.

22. The microactuator of claim 21, and further comprising a magnet attached to the first keeper and disposed within the gap.

* * * * *